W. R. SHECKLER.
GEARLESS DIFFERENTIAL.
APPLICATION FILED OCT. 27, 1921.

1,437,453.

Patented Dec. 5, 1922.

Witness:
Jas. E. Hutchinson.

Inventor:
Wilder R. Sheckler,
By Milans & Milans
Attorneys.

Patented Dec. 5, 1922.

1,437,453

UNITED STATES PATENT OFFICE.

WILDER R. SHECKLER, OF GREENVILLE, PENNSYLVANIA.

GEARLESS DIFFERENTIAL.

Application filed October 27, 1921. Serial No. 510,746.

*To all whom it may concern:*

Be it known that I, WILDER R. SHECKLER, a citizen of the United States, residing at Greenville, in the county of Mercer and State of Pennsylvania, have invented certain new and useful Improvements in Gearless Differentials, of which the following is a specification, reference being had therein to the accompanying drawing.

My invention relates to new and useful improvements in differentials, more particularly adapted for use with motor vehicles, and has for its principal object the provision of such a device which is gearless.

A further object resides in the construction of the differential in such a manner as to positively drive the oppositely disposed axles in unison, or which will permit one of the axles, with its associated driven wheel, to revolve independently as required when rounding a curve.

A still further object consists in so constructing the differential that it may be used for forward drive or for reversing, there being provided a plurality of pawls which are adapted to be automatically operated to engage a toothed member to positively drive the same, in either a forward or rearward direction, but at the same time allowing the member to independently rotate when rounding a curve or for any other purpose.

With the above and other objects in view, which will appear as the description proceeds, my invention consists in the novel details of construction and arrangement of parts, described in the following specification and illustrated in the accompanying drawings and while I have illustrated and described the preferred embodiments of the invention it will be understood that such changes might be made as will fall within the scope of the appended claims.

In the drawings:—

Figure 1:
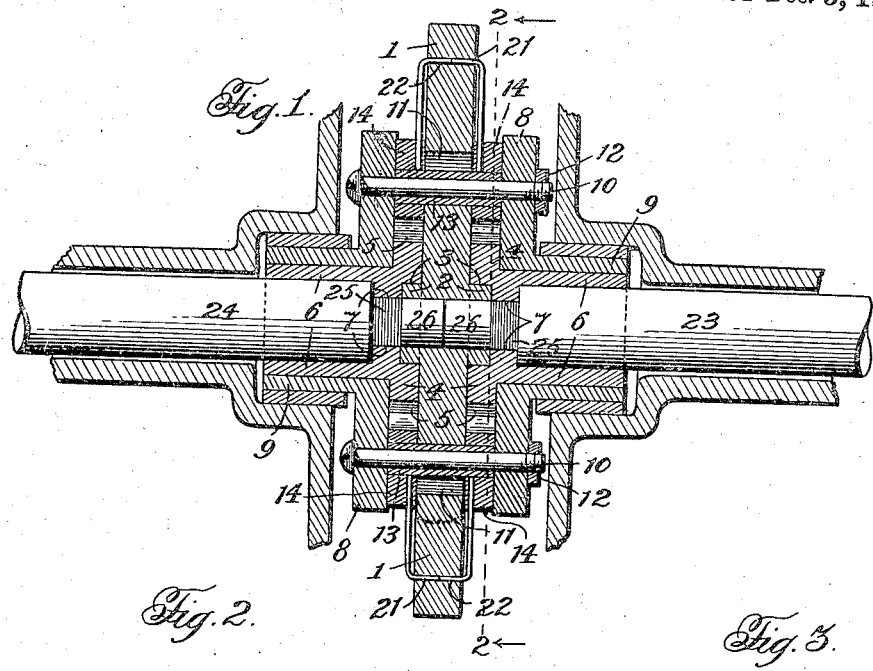
Fig. 1 is a longitudinal vertical section with parts shown in elevation.
Figure 2:
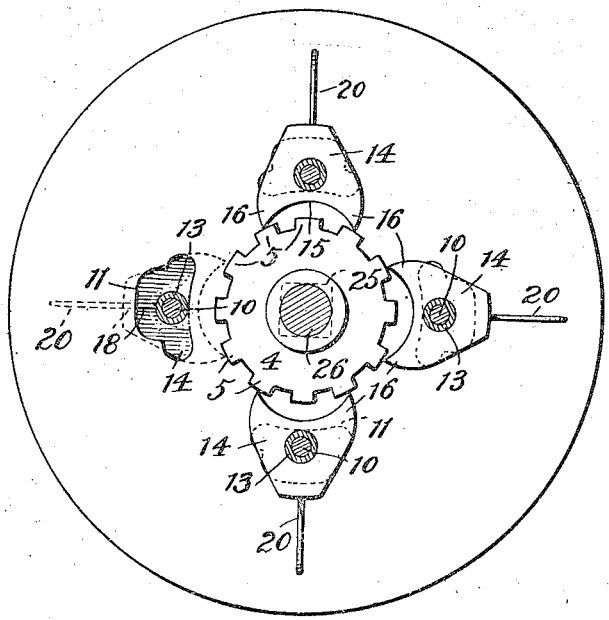
Fig. 2 is a section on the line 2—2 of Fig. 1 looking in the direction of the arrows.
Figure 3:
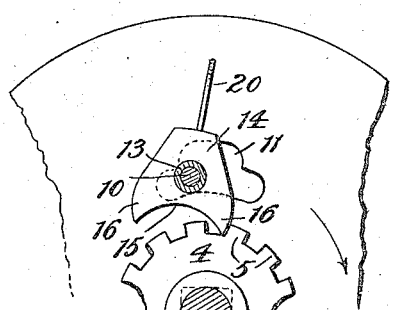
Fig. 3 is a fragmental side elevation showing one of the pawls in driving position.
Figure 4:
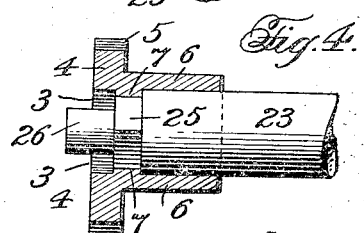
Fig. 4 is a longitudinal vertical section through one of the toothed wheels with the driving shaft shown in elevation.

In the drawings 1 indicates the member to be driven from the motor. This member, which is preferably in the form of a wheel, may be driven through means of a belt, chain, cogs or worm, it being understood that I do not desire to limit myself to any particular form of drive. This member 1 is provided on opposite faces with the circular flanges 2 which are adapted to be received in the circular openings 3 of the toothed wheels 4, one of said wheels engaging on each face of the member 1. The teeth 5 of the wheels 4 are shown as being straight on each face, but it will be understood that slight changes might be made in the shape of the teeth without departing from the invention. A sleeve 6 is formed on the outer face of each of the wheels 4, being of less diameter than the wheel, and is provided with the square portion 7 for a purpose which will later appear.

Carried upon each of the sleeves 6 is a plate 8 having the outwardly extending flange 9, said plates 8 being spaced from the member 1 and secured together by means of bolts 10 which pass through openings in the plates and through elongated openings 11 formed in the member 1. The bolts 10 receive the nuts 12 which will engage the outer face of one of the plates 8 as is clearly illustrated in the drawings. Carried upon each of the bolts 10 is a sleeve 13, the ends of which engage the inner faces of the plates 8 and position the same with respect to the member 1.

Mounted on the sleeves 13 are the pawls 14 the inner ends of which are curved as shown at 15, to fit around the toothed wheels 4, and to provide the projections 16 which are adapted to engage the teeth 5 of the wheels 4 in a manner to be later described. The pawls 14 are provided in their inner faces with grooves 18 which receive the inner ends of the springs 20, the outer ends of said springs being bent at right angles, as shown at 21, and received in openings 22 formed in the face of the member 1. The ends of the springs being received in the grooves 18 will allow for a slight sliding movement of the ends of the springs during operation, it being understood that when the member 1 rotates in either direction it will swing the pawls through means of the springs 20.

The right and left hand portions of the driven axle are shown at 23 and 24 respectively, each of said axles being provided adjacent the inner end with a reduced square portion 25 and a reduced extension 26. The square portion 25 is adapted to engage the square opening 7 in the toothed wheel 4 whereas the rounded extension 26 will be received in the circular opening of the member 1 formed by the flanges 2.

Having now described the details of construction I will endeavor to bring out the operation of the several parts. As previously stated power is transmitted to the member 1 to be driven and as the said member 1 is rotated it will in turn swing the pawls 14 through means of the springs 20. When operating forwardly the pawls 14 will be drawn so that the forward projection 16 will engage the teeth 5 of the wheels 4 thereby rotating the said wheels forwardly together with the plates 8. The rotation of the toothed wheels 4 will in turn operate the portions 23 and 24 of the driven axle upon which the drive wheels are carried. It will be seen that both portions of the axle are positively driven in unison, but in rounding a curve one of said axle portions may operate independently of the other. When power is applied rearwardly to the member 1 the operation will be reversed. The elongated openings 11, in the member 1, allow a slight rotation of the member 1 independently of the other parts, or sufficient for the springs 20 to swing the pawls 14 into proper engaging position. The several parts may be made of any desired material although metal will probably be found preferable in the general construction. Pawls 14 are preferably carried upon each of the sleeves 13 although it will be understood, if desired, only one set of pawls might be used.

Having fully described my invention what I claim as new and desire to secure by Letters Patent is:

1. A differential of the character described comprising a driven member, toothed wheels, axles connected to the toothed wheels, pawls adapted to engage the toothed wheels, and springs connected to the driven member and to the pawls for swinging the pawls as the direction of drive is reversed.

2. A differential of the character described comprising a driven member, toothed wheels, axles connected to the toothed wheels, pawls adapted to engage the toothed wheels and having recesses in one face thereof, and means for swinging the pawls as the direction of drive is reversed, said means comprising springs having one end connected to the driven member and the opposite ends received in the recesses of the pawls.

3. A differential of the character described comprising a driven member having an elongated opening therein, a bolt extending through said elongated opening, toothed wheels, axles connected to the toothed wheels, pawls carried by the bolt and adapted to engage the toothed wheels, and means for swinging the pawls as the driven member is moved.

4. A differential of the character described comprising a driven member having an elongated opening therein, toothed wheels, plates carried by the toothed wheels and operated from the driven member, axles connected to the toothed wheels, a bolt extending through the plates and the opening in the driven member, pawls carried by the bolt and positioned between the driven member and plates for engaging the toothed wheels, and means carried by the driven member for swinging the pawls as the driven member is moved.

5. A differential of the character described comprising a driven member having an opening therein, a bolt loosely mounted in the opening, toothed wheels normally rotatable independently of the driven member, axles connected to the toothed wheels, and pawls carried by the bolt, said pawls being normally held out of engagement with the toothed wheels but adapted to be swung into engagement therewith by operation of the driven member, the opening in the driven member allowing an initial movement of said member prior to engagement of the pawls with the ratchet wheels.

In testimony whereof I hereunto affix my signature in the presence of two witnesses.

WILDER R. SHECKLER.

Witnesses:
 Mrs. E. H. Mowry.
 Fred L. McClurg.